March 7, 1967  O. KREIBAUM  3,307,312
SELF-SUPPORTING LIGHT CONSTRUCTIONAL ELEMENTS
FOR CEILINGS, ROOFS AND WALLS
Filed Oct. 26, 1964  4 Sheets-Sheet 1

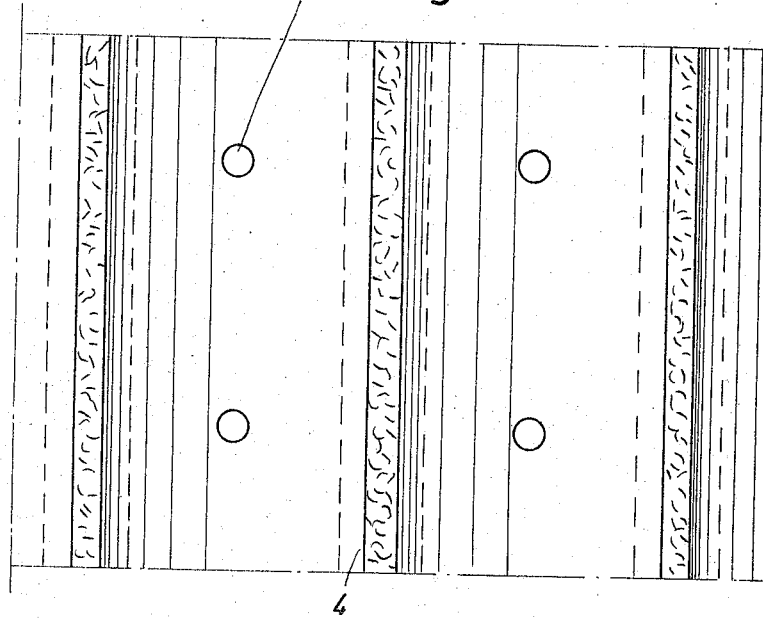
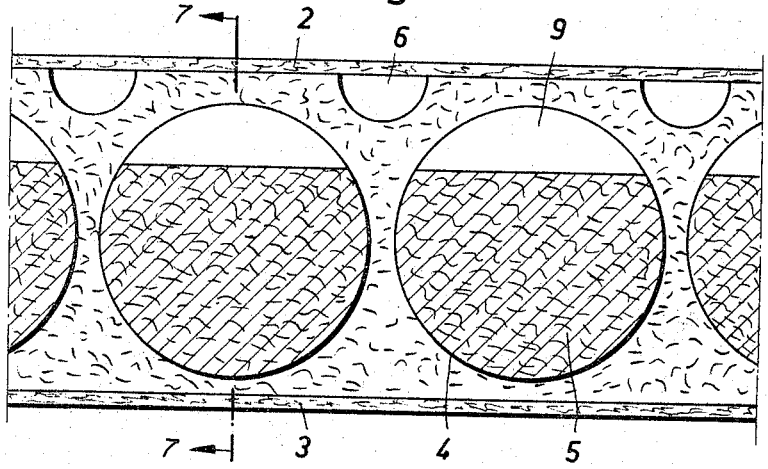

March 7, 1967  O. KREIBAUM  3,307,312
SELF-SUPPORTING LIGHT CONSTRUCTIONAL ELEMENTS
FOR CEILINGS, ROOFS AND WALLS
Filed Oct. 26, 1964  4 Sheets-Sheet 4

United States Patent Office 3,307,312
Patented Mar. 7, 1967

3,307,312
SELF-SUPPORTING LIGHT CONSTRUCTION-
AL ELEMENTS FOR CEILINGS, ROOFS
AND WALLS
Otto Kreibaum, Lauenstein, Hannover, Germany
Filed Oct. 26, 1964, Ser. No. 406,510
Claims priority, application Germany, Oct. 31, 1963,
K 51,243
7 Claims. (Cl. 52—303)

The present invention relates to the improvement of ceiling, roof and wall elements used in light building construction.

Light building elements primarily take the form of frame elements with frame or lattice bars arranged principally at the edges. The bars form the support framework. In order to produce a panel enclosing a space they are provided on one or both sides with thin, statically ineffective plankings. The hollow spaces (compartments) produced can be filled with heat insulating material to improve the heat insulation of the element.

Better suited for industrial conveyor-belt production are what are termed compound bodies, consisting of a core of support substance and thin convering layers round it. The covering layers essentially absorb the forces acting on the compound body, while the core is supposed to prevent any buckling or sagging of these covering layers. The supporting substance core in this connection is preferably coated to obtain thermal insulation.

While, however, with framed light building bodies, the thermally insulating substances can be freely chosen, i.e. with regard solely to their thermal properties, with compound bodies with support cores coated with a heat insulating material, the problems of statics involved must also be taken into account. With compound bodies, therefore, the use of high value insulating substances is frequently impossible for reasons of statics. These insulating substances, because of their high porosity have negligible strength characteristics, which as a rule are insufficient to support the thin carrying cover layers, particularly when the building element is subjected at its edges to comparatively high stresses through individual loads and so on. For the supporting substance, cores of light building compound bodies, primarily materials with good strength properties and medium resistance to the passage of heat are used (e.g. light concrete or chipboard substances). The thermal insulation properties present necessitate completely undesirably large building component thicknesses which are unnecessary statically.

With these compound bodies, difficulties are also involved in the suitable application of venting zones for discharging water vapour, while with frame elements this duty as a rule can be taken over by the compartment surfaces.

The present invention constitutes novel and useful improvements over my prior patent, No. 2,960,423, issued November 15, 1960.

The present invention is based on the surprising discovery that a light building element with very advantageous properties can be obtained if a compound panel is used produced from a core layer provided with longitudinal ducts and made from compressed chips with synthetic resin bonding and having finish panels of plywood, hard fibre boards, asbestos cement or similar material applied on both sides, whose core layer, at least 10 cm. thick, is provided with central longitudinal bores filled with heat-insulating substances, whose thickness is greater than half the core layer thickness and also with outer ducts of smaller cross-section offset in relation to the central longitudinal bores and formed in the side of the core on the cold side of the light building element, which outer ducts are in communication at the element edges with the outer air and are closed off by the imperforate finish board superimposed on such side of the core.

In the present invention the support core is so loosened by suitably arranged recesses that, on the one hand, the static section of the support core is unaffected or only very slightly affected and, on the other hand, a sufficiently large proportion of hollow space is obtained to increase the thermal insulation of the building component. For filling the recesses high value thermal insulating materials, e.g. mineral or vegetable fibre insulating substances, synthetic foams and so on are used.

According to a further feature of the present invention, the new light building element may be provided with transverse ducts which connect the central longitudinal bores with the outer ducts adjacent to them and acting as venting ducts.

According to an embodiment of the invention, these transverse ducts may connect the central longitudinal bores direct with the outer atmosphere. Preferably, the transverse ducts viewed in the longitudinal direction are arranged in rows one above the other at a distance spaced apart at least equal to the cross-section of the longitudinal bores.

It is also possible to provide longitudinal ducts on the inside of the light building element for accommodating installation pipings, the mode of construction of which advantageously corresponds to the venting ducts on the outside of the light building element.

According to a further feature of the present invention, the form of embodiment can be such that the central longitudinal bores are only partly filled with heat insulating material in such a way that at the cold side of the light building element an air space in the central longitudinal bores is formed passing through over the whole length of the element at least at the element edges and connected with the outer air.

Some embodiments of the invention will now be described by way of example with reference to the accompanying drawings.

FIGURE 5 is a longitudinal section along the line 5—5 of FIGURE 4.

FIGURE 6 shows a further embodiment of the invention.

Like reference numerals are used in the figures for like parts.

Figure 1:
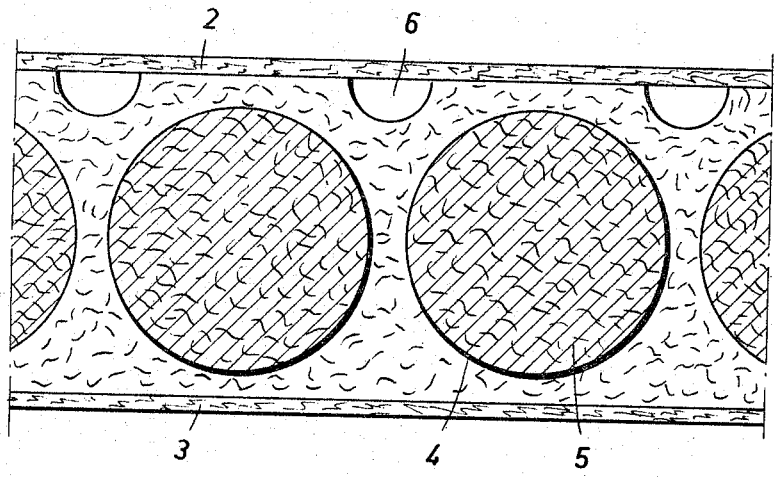
FIGURE 1 is a cross-section through a light building element formed in accordance with the invention.

The core layer formed of compressed chips, bonded together by means of a synthetic resin binding agent, is covered on both sides by finish panels 2 and 3. In the center of the core layer, longitudinal bores 4 with round cross-section are provided and are filled with heat insulating material 5.

On the cold side of the light building element, which is defined by the panel 2, outer ducts 6 which are semi-circular in cross-section and offset in relation to the central longitudinal ducts are provided. The ducts 6 are closed off by the superimposed finish panel 2 and communicate with the outer atmosphere through the end edges of the board and are provided to discharge water vapor.

Figure 2:
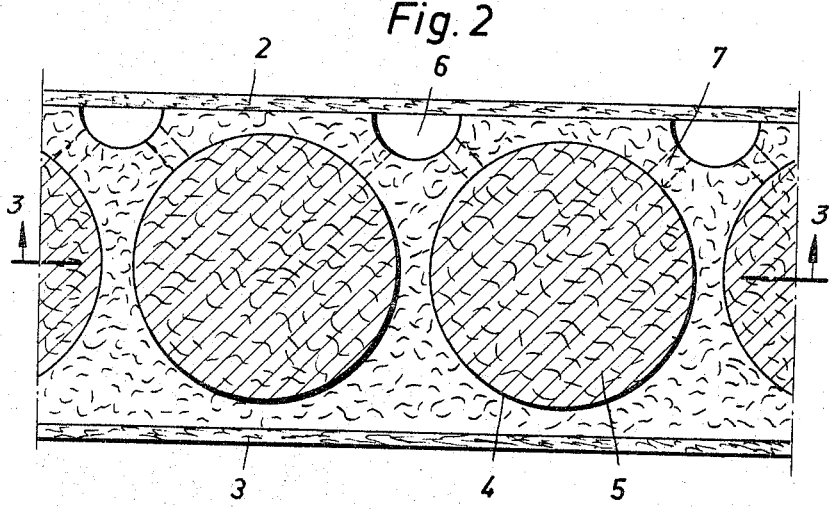
FIGURE 2 represents the form of embodiment of the invention provided with transverse ducts.
Figure 3:
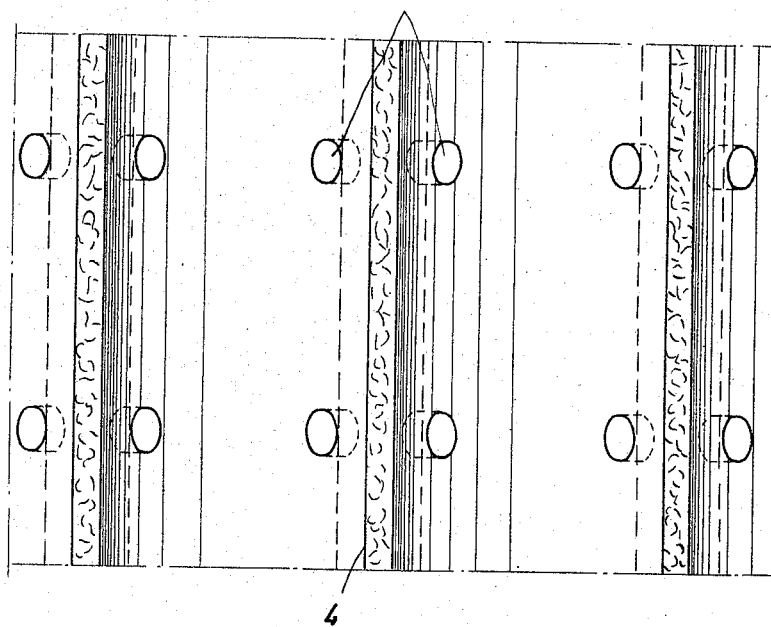
FIGURE 3 is a longitudinal section along the line 3—3 in FIGURE 2.

In FIGURES 2 and 3, transverse ducts 7 are provided in the core and which connect the central longitudinal bores 4 with the outer ducts 6.

Figure 4:
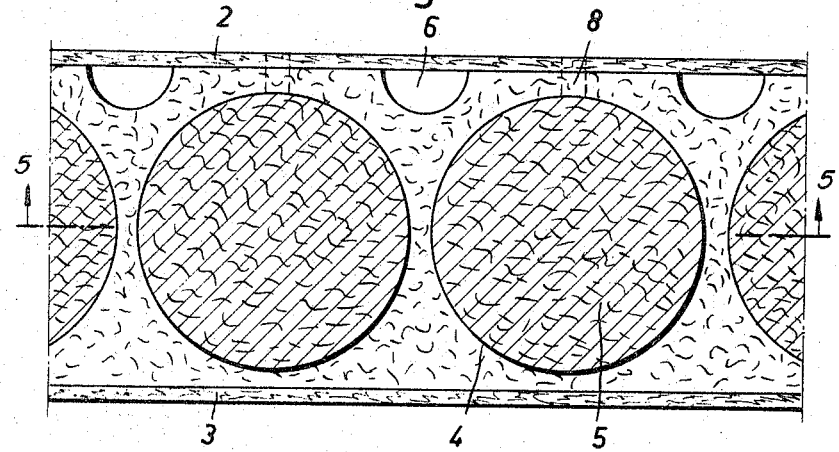
FIGURE 4 is a cross-section through another embodiment of the invention.

In the embodiment of FIGURES 4 and 5, the central longitudinal bores 4 are connected direct by transverse ducts 8 with the outer atmosphere.

Figure 7:
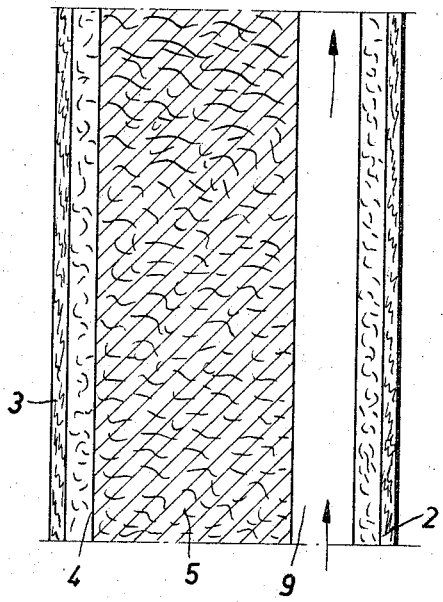
FIGURE 7 is a longitudinal section along the line 7—7 in FIGURE 6.

In FIGURES 6 and 7 is shown how the longitudinal bores 4 are not completely filled with the insulation material but only in such a way that in the central longitudinal ducts spaces 9 of cylindrical sector form remain free which serve additionally for venting purposes by forming an air space passing through the whole longitudinal extent of the core and communicating with the atmosphere at the end edges of the core.

Figure 8:
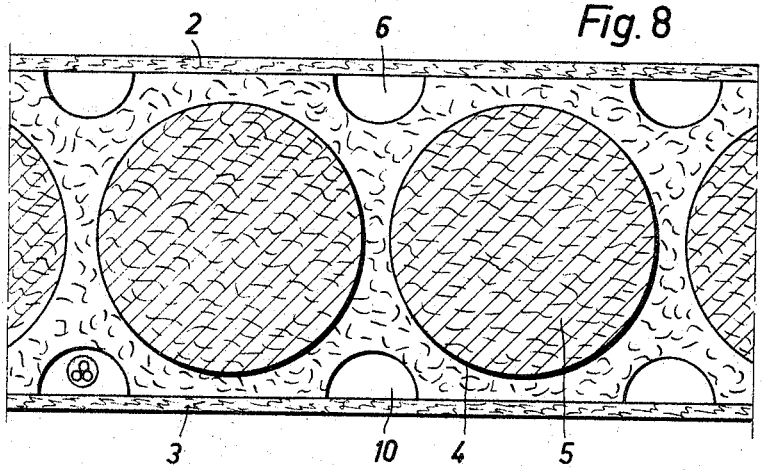
FIGURE 8 shows in cross-section a form of embodiment in which the outer ducts are arranged offset in the inner and outer sides in relation to the central longitudinal bores.

In FIGURE 8 on the inside of the light building element corresponding outer ducts 10 are provided which serve for accommodating installation pipings.

What I claim is:

1. A structural and insulating building board comprising a core of compressed chips adhered together by an adhesive and having opposing inner and outer sides and opposing end edges, imperforate finish panels fixedly superimposed on said sides, said outer side and its finish panel being adapted to face the outer atmosphere, said core being formed with longitudinally extending laterally spaced bores centrally between the sides, thermal insulating substances filling said bores and being of a thickness of more than one half the thickness of the core, said outer side of the core being formed with longitudinal surface ducts of smaller cross-section than the bores, said ducts being closed off by the superimposed finish panel on the outer side and opening to the atmosphere through the end edges of the core and said ducts being disposed parallel with the bores and offset in relation thereto whereby the board is vented to the outer atmosphere to discharge water vapor.

2. The invention of claim 1, wherein said core is provided with transverse ducts which connect the longitudinal bores with the longitudinal ducts adjacent to them and act as venting ducts.

3. The invention of claim 2, wherein the transverse ducts viewed in the longitudinal direction are arranged in rows one above the other at a distance spaced apart at least equal to the cross-section of the longitudinal bores.

4. The invention of claim 1, wherein the core is provided with transverse ducts which connect the longitudinal bores direct with the atmosphere.

5. The invention of claim 4, wherein the transverse ducts viewed in the longitudinal direction are arranged in rows one above the other at a distance spaced apart at least equal to the cross-section of the longitudinal bores.

6. The invention of claim 1, wherein the longitudinal bores are only partly filled with the insulating substances to create at the portions of the bores facing the outer side of the core an air space passing through the whole longitudinal extent of the core and communicating with the atmosphere at the end edges of the core.

7. The invention of claim 1, wherein the inner side of the core is formed with longitudinal surface ducts that are adapted to accommodate piping elements.

References Cited by the Examiner

UNITED STATES PATENTS

| 1,921,518 | 8/1933 | Frobisher | 52—606 |
| 2,281,121 | 4/1942 | Straight | 52—606 |
| 2,445,290 | 7/1948 | Gonda | 161—139 |
| 2,528,049 | 10/1950 | Gonda | 52—404 |
| 2,960,423 | 11/1960 | Kreibaum | 161—162 |

FOREIGN PATENTS

| 907,872 | 10/1962 | Great Britain. |
| 928,728 | 6/1963 | Great Britain. |

FRANK L. ABBOTT, *Primary Examiner.*

JOHN E. MURTAGH, RICHARD W. COOKE, JR., *Examiners.*